March 8, 1949.

C. F. SHEPARD
TARGET FOR TESTING THE RESOLVING
POWER OF THE HUMAN EYE
Filed March 19, 1946

2,463,813

INVENTOR
Carl F. Shephard
BY
Ivan E. A. Konigsberg
ATTORNEY

Patented Mar. 8, 1949

2,463,813

UNITED STATES PATENT OFFICE 2,463,813

TARGET FOR TESTING THE RESOLVING POWER OF THE HUMAN EYE

Carl F. Shepard, Chicago, Ill., assignor to Keystone View Company, Meadville, Pa., a corporation of Pennsylvania Application March 19, 1946, Serial No. 655,557

1 Claim. (Cl. 88—20)

This invention relates to improvements in charts or targets for use in visual acuity tests. The object of the invention is to provide an improved visual acuity test target, whereby the tests may be conducted in an efficient scientific manner to provide dependable data for correct diagnosis of visual acuity or visual resolving power and ability.

The targets embodying the invention are designed primarily for use in testing visual acuity, i. e. to measure the resolving power of the human eye as it is adjusted for near seeing. Secondarily, the targets may be used to approximate line vision under the same conditions. The targets will also be found useful for conducting other visual tests.

The targets are printed on charts forming stereograms and comprise printed symbols forming three different types of test areas. The latter may be any size or shape. Preferably each test area subtends an angle to the eye of not less than one degree and not more than eight degrees.

One type of test area is composed of black dots of specific size and spacing for testing resolving power. Another type of test area is composed of crossed lines of specific width and spacing for testing line vision. A third type of area is of even gray color. The purpose of the latter is to discourage guessing by the subject as all three types of areas have the same appearance when the details of the first two types of strictly test areas are too small for recognition.

The characteristic novel features of the invention are more particularly set forth in the following specification and illustrated in the accompanying drawing in which Fig. 1 is a view of a stereogram presenting a total pattern of test areas for both eyes when the chart bearing the targets is used in a stereoscope so that the vision of both eyes working together may be tested.

Figure 1:
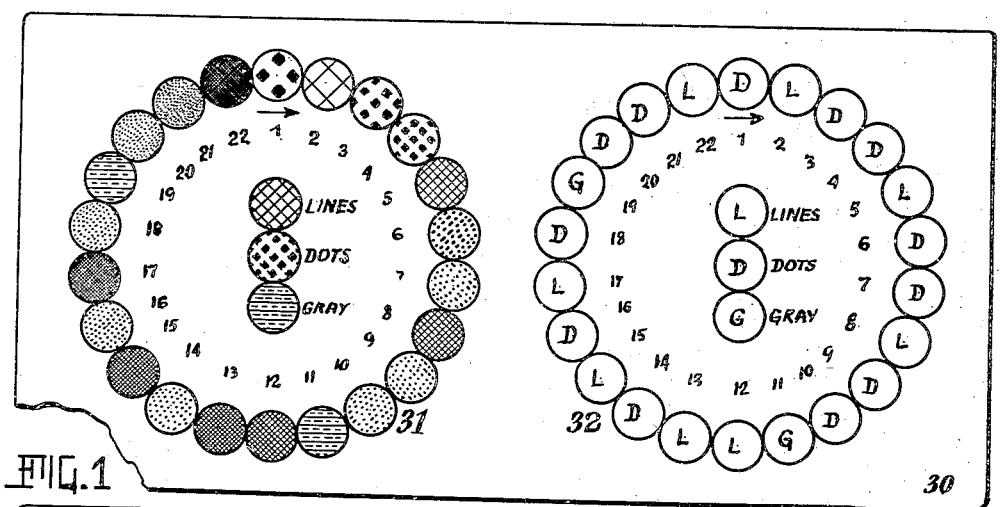

The stereograms are preferably printed on stiff cards 30 for convenience in handling, storing and indexing. The targets are numbered 31 through 36 as shown in the three figures.

Each target comprises twenty-two small circles arranged in a large ring, the circles touching each other. Within the ring there are three circles of the same size as the other circles. The purpose of the three inside circles is for instruction while conducting a test.

The circles in targets 31, 32, 34 and 35 are filled with dots, with lines or with solid gray color, respectively. The size of the dots and of the lines and the spacing between them is carefully calculated to provide tests from easily seen to invisible. Each circle in the ring is numbered for identification and the three inside circles are labelled as shown. The numbers of the circles run sequentially clockwise from the uppermost circle as also indicated by an arrow. In order to avoid confusion in describing the circles, the number of the circle will be used as a reference character in referring to any particular circle. The circle areas in the targets 33 and 36 are all white.

Inasmuch as it is very difficult to illustrate by hand in the drawing the gradations in the size and spacing of the dots and lines, the attempt to do so has been made only in the first target 31. The areas in the other targets are marked with capital letters "D," "L" and "G" to indicate that the areas or circles thus marked are filled with dots, lines and even gray color, respectively. The arrangement of different areas in the targets 34 and 35 differs from the order of arrangement in the targets 31 and 32, which are duplicates. The difference in the order of arrangement of test areas in the three figures will best be appreciated from the following table in which the circles appear in numerical order and the test symbol within each circle, dots, or lines, or even gray color, is indicated by the aforesaid capital letters arranged alongside the numbers of the circles.

| Circle | Targets 31 and 32 | Target 34 | Target 35 |
|---|---|---|---|
| 1 | D | D | L |
| 2 | L | D | D |
| 3 | D | L | D |
| 4 | D | D | D |
| 5 | L | L | L |
| 6 | D | L | D |
| 7 | D | D | L |
| 8 | L | L | D |
| 9 | D | D | D |
| 10 | D | L | D |
| 11 | G | D | L |
| 12 | L | G | L |
| 13 | L | L | G |
| 14 | D | L | D |
| 15 | L | D | L |
| 16 | D | D | D |
| 17 | L | G | L |
| 18 | D | D | D |
| 19 | G | L | L |
| 20 | D | D | G |
| 21 | D | D | D |
| 22 | L | L | L |

The circles in Fig. 1 which are numbered 1, 3, 4, 6, 7, 9, 10, 14, 16, 18, 20 and 21 are filled with dots of such size and spacing that when the eye has not sufficient resolving power to distinguish the separate dots within the area, the circle of that area will appear as if filled with a solid gray color and indistinguishable not only from the other dotted areas but also indistinguishable from the solid gray areas. The same explanation and condition applies to the areas in Fig. 1 which are numbered 2, 5, 8, 12, 13, 15, 17 and 22 which are filled with crossed lines. The circles 11 and 19 in Fig. 1 are filled with a solid gray color as shown. The instruction circles within the ring are labelled "lines," "dots" and "gray," respectively, as shown.

Only the circles filled with dots are significant for test scores and diagnosis. These circles are not in the same positions in the several rings of circles in order to prevent the subject from guessing and memorizing the positions of the significant areas. In each target there is at least one gray circle, for example, the circles 11, 12 and 13 in the three figures, respectively, near the middle of the ring for the purpose of assisting the technician to prevent guessing when a test is made.

While the circles filled with the crossed lines are not primarily testing elements, they may serve certain special cases to differentiate between certain visual skills. Then again, the invention contemplates test areas filled with symbols other than those shown in the drawing. For example, areas may be filled with broken lines to test alinement or vernier vision. Other types of test areas may be used. Variations from the types shown are not illustrated.

A visual acuity test employing the targets embodying the invention may be conducted by following substantially the following procedure. First the attention of the subject is directed to the three circles within the ring and he is asked to distinguish between dots, lines and gray color. This is a sort of pre-view of the areas later to be pointed out. Thereafter it is explained that the circle areas are filled with dots, or lines, or gray color, and that the dots and lines become smaller and more closely spaced as the eyes move around the ring of circles, the object being to have the subject announce which circle contains the smallest dots or thinnest closest lines. The technician may use a pointer during the test or identify the circles by numbers. The subject will also announce the number of the circle which he finds has the smallest dots or lines to be distinguished. The number of that particular circle will then be recorded on a chart, not shown. Circles filled with dots or lines which are not recognized by the subject will appear gray.

Figure 2:
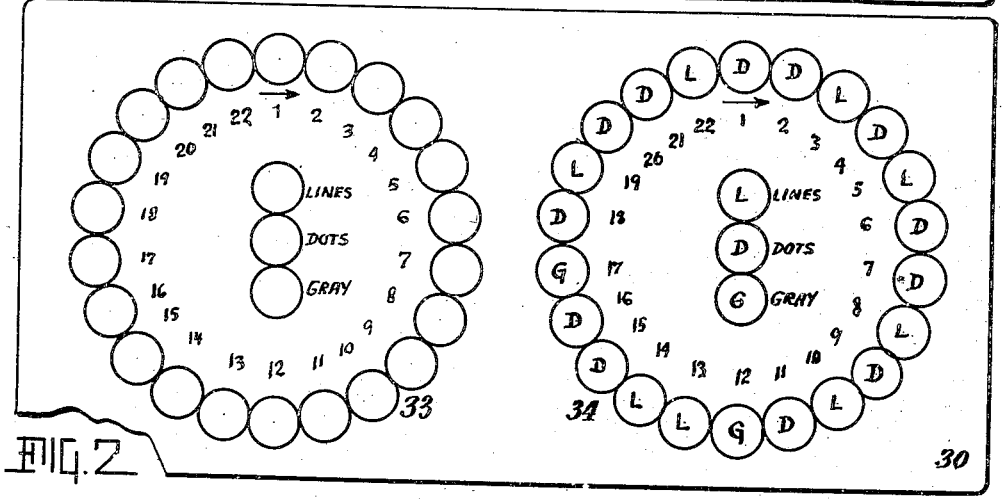
Fig. 2 is a view of a stereogram presenting the testing areas to only the right eye, so that only the right eye is tested although both eyes may be seeing the targets.
Figure 3:
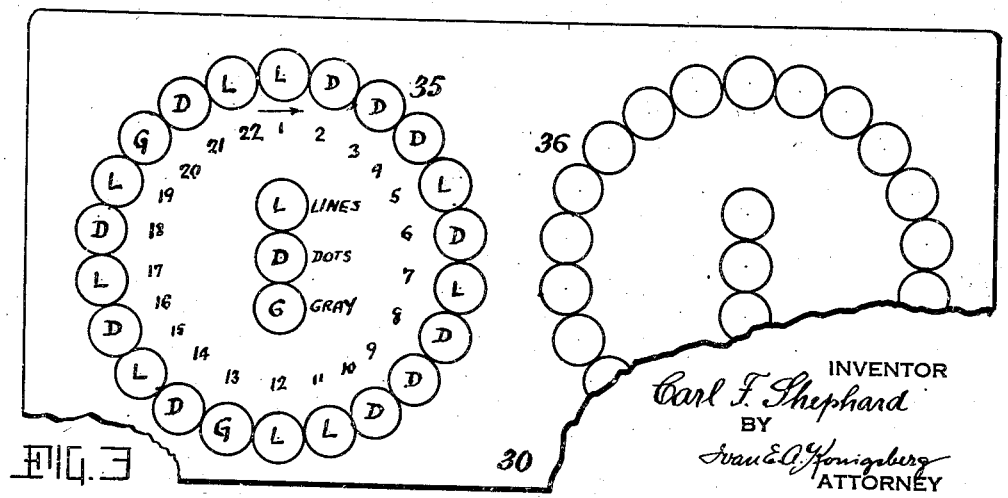
Fig. 3 is a view similar to that shown in Fig. 2 but is intended for only the left eye.

The stereogram in Fig. 1 is used only when the subject is tested for binocular vision. The stereogram in Fig. 2 is used for testing the right eye, that in Fig .3 for use in testing the left eye. If a subject can distinguish the type of area in circle 16 he is said to have expected normal vision. However, one may of course rate the degree of visual acuity on a different basis.

In addition to what has already been explained, the invention is characterized by the following novel features in its embodiment and use. Guessing is discouraged by the patient's knowledge that he must choose between three types of circle filled areas. This knowledge he obtains at the start by observing the three "instruction" circles within the ring. The patient must have normal resolving power or ability to see details in order to make a normal score because all the circles are of the same size and reflectivity. This feature is believed to be unique and highly advantageous over prior testing means of like character which use the letters of the alphabet because the letters may be named merely on the basis of familiarity with the commonly known form of letters. On the other hand, some patients will not try to "see" letters or characters which appear too small.

The nature of the test makes it comparable to certain requirements in industry where it is essential that workers should be able to discover flaws in surfaces and the like. The ability to recognize letters or characters from their general shapes is no guarantee of the required vision. It will further be understood that the matter of arranging the circle areas in a ring is a matter of convenience. Also, the specifications of the details within each circle may be changed to suit different distances of test and for use in instruments other than streoscopes. One important feature of the invention is that the test areas are of uniform size regardless of the size and spacing of the details therein. The circles, numbers and lettering of all the targets is done by printing, hence these elements appear in target 33. The filled in detail varies for each target as explained, hence is added later. However, as seen in target 36 nothing but the circles appear thereon if so desired. Of course it is also within the invention that targets 33 and 36 be simple white spaces.

The diameter of each dot and of each space between dots subtends an angle to the eye when properly set in a stereoscope or like instrument. In the actual stereograms, the angles are reciprocals of .1, .2, .3, .4, .5, etc. to 1.3. The angles are of course specifically calculated for other special purposes in accordance with well known principles of visual optics without departing from the scope of the invention. The dots are carefully spaced and placed within their respective circles so that the area presents only three possible appearances to various eyes namely, a pattern of dots, or a pattern of oblique lines, or solid gray. To eyes which see the dotted area as a pattern of oblique lines, such area will present the same appearance as the lined areas. If the eyes see the dotted area as solid gray, the solid gray areas will present the same appearance. Persons who suffer from the most common astigmatic distortion at the critical point or threshold of their visual perception or resolving power see a vertical row of dots as a vertical line instead of seeing the design for what it really is.

The width of each line in the crossed lines design subtends an angle to the eye approximating one tenth of the angle subtended by each dot in a dot filled circle of corresponding visibility. In the case of both dot filled circles and line filled circles the density or blackness of the dots and lines in relation to the brightness or whitness of the spaces between, together with the total areas of black and white, are calculated and produced so that the total light reflecting power of each circle matches the total light reflecting power of the solid gray circles. Hence each of the three types of circles is indistinguishable from the other two types when the dots and the lines are below the resolving power of the eyes being tested.

The inclusion of solid gray areas is an important feature of the invention. Some patients are often quite sensitive to the technician's tone of voice. If that tone betrays that there are really no solid gray areas, the patient is quite reluctant to say that any circles look to be solid gray, whereas if it is known that some circles are actually solid gray, the patient more quickly and confidently states that circles with dots and lines below his resolving power look solid gray to him. Another feature of the invention resides in the fact that the black area comprising all the black dots in the critical areas equal the black area comprising all the black lines in the non-critical areas. Thus very slight differences in brightness or relative grayness are visually perceptible even when the critical details are not. This is believed to be a wholly novel characteristic feature of the invention.

Psychologically, distance of objects seen in part are judged by the size of the objects. If circles or other identical shapes are presented at the same distance and they are all of the same size, they will all "appear" to be the same distance away. If they are of different sizes and shapes, the tendency will be to judge the smaller ones to be farther away, thus introducing a factor in visual discrimination which this invention seeks to eliminate or control. It is known that some subjects, at the time of being tested, are already convinced by experience that they can see better at one distance than another and fail to demonstrate their full powers of visual discrimination when the test areas appear to be at an unfavorable distance.

Vision test targets embodying this invention eliminate uncertainty and guesswork on the part of the patient and provide dependable data for correct diagnosis and visual classification for industrial, military or other placements.

I claim:

A target for testing the resolving power of the human eye comprising three groups of testing areas containing selected test details, one of said groups forming critical areas containing black dots for testing resolving power, said dots being designedly graded in size and spacing within their respective areas to present areas forming only patterns of dots, oblique lines or solid gray and exclude the appearance of horizontal and vertical black lines, the second group forming confusion areas containing black oblique crossed lines graded in size and spacing for testing line vision, the third group also forming confusion areas containing solid gray color, all of said testing areas being of the same size and shape and arranged in arbitrary sequence to form a closed ring pattern wherein all of said areas have the same position with respect to all the other areas, the sum of the black area comprising all the said black dots being equal to the sum of the area comprising all of the said black lines, the size and spacing of the said dots and of the said lines being graded from easily visible to invisibility so that the areas containing the same are visually indistinguishable from each other and from the solid gray areas except when the details of the dotted areas are resolvable.

CARL F. SHEPARD.

REFERENCES CITED

The following references are of record in the file of this patent:

UNITED STATES PATENTS

| Number | Name | Date |
|---|---|---|
| 1,270,830 | Ives | July 2, 1918 |
| 2,196,906 | Sherman | Apr. 9, 1940 |
| 2,326,965 | Neumueller | Aug. 17, 1943 |
| 2,385,992 | Jobe | Oct. 2, 1945 |